(12) United States Patent
Alsumail et al.

(10) Patent No.: US 12,429,842 B2
(45) Date of Patent: Sep. 30, 2025

(54) METHOD AND SYSTEM FOR MANAGING PLANT SAFETY USING MACHINE LEARNING

(71) Applicant: SAUDI ARABIAN OIL COMPANY, Dhahran (SA)

(72) Inventors: Hisham Alsumail, Hofuf (SA); Bashar Y. Melhem, Abqaiq (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 1029 days.

(21) Appl. No.: 17/496,141

(22) Filed: Oct. 7, 2021

(65) Prior Publication Data

US 2023/0115475 A1 Apr. 13, 2023

(51) Int. Cl.
*G05B 19/042* (2006.01)
*G05B 23/02* (2006.01)
(Continued)

(52) U.S. Cl.
CPC ....... *G05B 19/0428* (2013.01); *G05B 23/024* (2013.01); *G05B 23/0267* (2013.01);
(Continued)

(58) Field of Classification Search
CPC .............. G05B 19/0428; G05B 23/024; G05B 23/0267; G05B 23/0286; G06N 20/00
See application file for complete search history.

(56) References Cited

U.S. PATENT DOCUMENTS 10,558,746 B2  2/2020  Goulikar et al.
12,119,982 B2 * 10/2024  Goodwin ............... G06N 3/045
(Continued)

FOREIGN PATENT DOCUMENTS

CN   108447534 A   8/2018
CN   109582963 A   4/2019
(Continued)

OTHER PUBLICATIONS

Office Action issued by Saudi Arabian Patent Office for corresponding Saudi Arabian patent application No. SA 122440342, mailed Sep. 11, 2024 (13 pages).

(Continued)

*Primary Examiner* — Manuel A Rivera Vargas
(74) *Attorney, Agent, or Firm* — Osha Bergman Watanabe & Burton LLP

(57) ABSTRACT

A method may include determining classified safety data regarding a plant area using the unstructured data and a first machine-learning model that uses natural language processing. The method may further include determining a plant hazard for the plant area using a second machine-learning model, the classified safety data, and the structured safety data. The method may further include obtaining historical hazard data for various plant facilities. The method may further include determining a hazard rate for the plant area based on the plant hazard and the historical hazard data. The method may further include generating, within a graphical user interface on the user device, a hazard map for a plant facility. The method may further include determining a mitigation operation for the plant hazard. The method may further include transmitting a command to a control system to perform the mitigation operation.

20 Claims, 6 Drawing Sheets

(51) Int. Cl.
   *G06N 20/00* (2019.01)
   *G06Q 10/0635* (2023.01)
(52) U.S. Cl.
   CPC ......... *G05B 23/0286* (2013.01); *G06N 20/00* (2019.01); *G06Q 10/0635* (2013.01)

(56) References Cited

U.S. PATENT DOCUMENTS

| | | |
|---|---|---|
| 2018/0165604 A1 | 6/2018 | Minkin et al. |
| 2018/0268506 A1 | 9/2018 | Wodetzki et al. |
| 2018/0330238 A1 | 11/2018 | Luciw et al. |
| 2018/0367561 A1 | 12/2018 | Givental et al. |
| 2019/0260764 A1 | 8/2019 | Humphrey et al. |
| 2020/0193341 A1 | 6/2020 | Barak et al. |
| 2020/0272112 A1* | 8/2020 | Carullo ............. G05B 13/0265 |
| 2020/0364253 A1 | 11/2020 | Mugan et al. |
| 2021/0166197 A1 | 6/2021 | Baxter |
| 2022/0092534 A1* | 3/2022 | Dani ................. G06Q 10/0835 |

FOREIGN PATENT DOCUMENTS

| | | |
|---|---|---|
| CN | 110175272 A | 8/2019 |
| KR | 102008707 B1 | 8/2019 |

OTHER PUBLICATIONS

Office Action issued in corresponding SA Application No. 122440342 dated Mar. 25, 2024 (10 pages).
"Identification of Safety Critical Equipment (SCE)", Canada's Oil & Natural Gas Producers, Mar. 2019 (28 pages).
"Process Safety Management for Petroleum Refineries: Lessons Learned from the Petroleum Refinery Process Safety Management National Emphasis Program", OSHA 3918-08, Occupational Safety and Health Administration, 2017 (40 pages).
Tang, Yichuan, "Deep Learning using Support Vector Machines", 2015, arXiv:1306.0239v4 (5 pages).

* cited by examiner

METHOD AND SYSTEM FOR MANAGING PLANT SAFETY USING MACHINE LEARNING

BACKGROUND

Machinery, equipment, appliances, tools, or human behavior provide many possible hazards within a plant facility for plant personnel. For example, hazards may pose specific risks based on moving parts of machinery, contact with hazardous chemicals and biological agents, and simply human error resulting from worker performance onsite. However, no single dataset exists in an easily readable format and provides sufficient knowledge to identify, predict or anticipate these hazards and assess the associated risks to human workers and equipment.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method that includes obtaining, by a computer processor and from a user device, a request to determine a plant hazard regarding a plant area at a plant facility. The method further includes obtaining, by the computer processor, structured safety data and unstructured data regarding the plant area. The structured safety data include maintenance data and inspection data regarding the plant area. The unstructured data include user-submitted data regarding a compliance report and a site assessment report. The method further includes determining, by the computer processor, classified safety data regarding the plant area using the unstructured data and a first machine-learning model that uses natural language processing. The method further includes determining, by the computer processor, a plant hazard for the plant area using a second machine-learning model, the classified safety data, and the structured safety data. The second machine-learning model determines predicted safety data. The method further includes obtaining, by the computer processor, historical hazard data for various plant facilities. The method further includes determining, by the computer processor, a hazard rate for the plant area based on the plant hazard and the historical hazard data. The method further includes generating, by the computer processor and within a graphical user interface on the user device, a hazard map for the plant facility. The hazard map identifies the plant hazard and the hazard rate in association with the plant area. The method further includes determining, by the computer processor automatically in response to the hazard rate failing to satisfy a mitigation criterion, a mitigation operation for the plant hazard. The method further includes transmitting, by the computer processor, a command to a control system to perform the mitigation operation.

In general, in one aspect, embodiments relate to a server that includes a computer processor and a memory. The server obtains, from a user device, a request to determine a plant hazard regarding a plant area at a plant facility. The server obtains structured safety data and unstructured data regarding the plant area. The structured safety data include maintenance data and inspection data regarding the plant area. The unstructured data include user-submitted data regarding a compliance report and a site assessment report. The server determines classified safety data regarding the plant area using the unstructured data and a first machine-learning model that uses natural language processing. The server determines a plant hazard for the plant area using a second machine-learning model, the classified safety data, and the structured safety data. The second machine-learning model determines predicted safety data. The server obtains historical hazard data for various plant facilities. The server determines a hazard rate for the plant area based on the plant hazard and the historical hazard data. The server generates, within a graphical user interface on the user device, a hazard map for the plant facility. The hazard map identifies the plant hazard and the hazard rate in association with the plant area. The server determines, automatically in response to the hazard rate failing to satisfy a mitigation criterion, a mitigation operation for the plant hazard. The server transmits a command to a control system to perform the mitigation operation.

In general, in one aspect, embodiments relate to a system that includes various user devices, a control system, and various plant devices coupled to the control system. The system further includes a server coupled to the user devices and the control system. The server obtains, from the user devices, a request to determine a plant hazard regarding a plant area at a plant facility. The server obtains structured safety data and unstructured data regarding the plant area. The structured safety data include maintenance data and inspection data regarding the plant area. The unstructured data include user-submitted data regarding a compliance report and a site assessment report. The server determines classified safety data regarding the plant area using the unstructured data and a first machine-learning model that uses natural language processing. The server determines a plant hazard for the plant area using a second machine-learning model, the classified safety data, and the structured safety data. The second machine-learning model determines predicted safety data. The server obtains historical hazard data for various plant facilities. The server determines a hazard rate for the plant area based on the plant hazard and the historical hazard data. The server generates, within a graphical user interface on the user device, a hazard map for the plant facility. The hazard map identifies the plant hazard and the hazard rate in association with the plant area. The server determines, automatically in response to the hazard rate failing to satisfy a mitigation criterion, a mitigation operation for the plant hazard. The server transmits a command to the control system to perform the mitigation operation.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Figure 1:
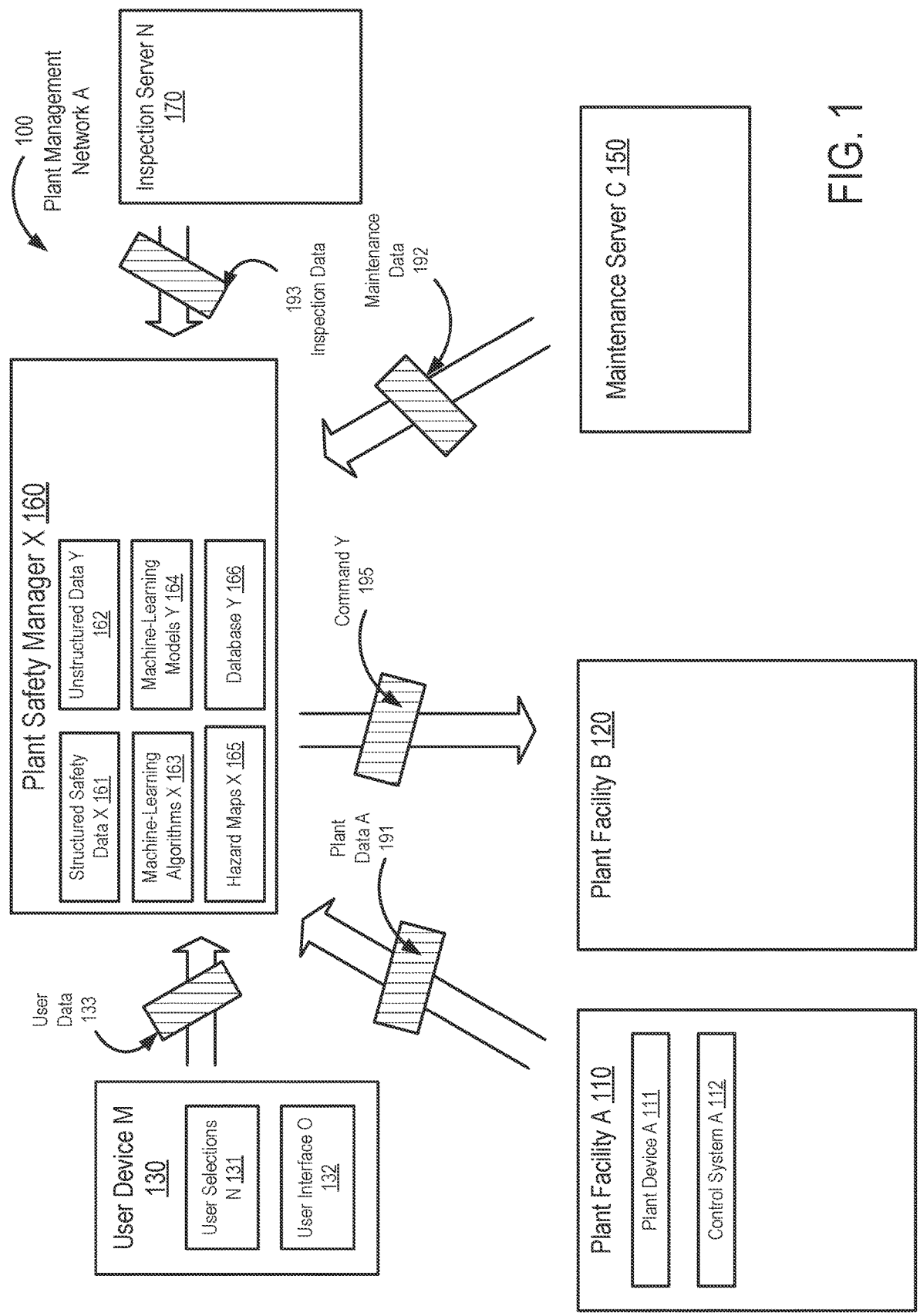
FIG. 1 shows a system in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include systems and methods for using artificial intelligence and machine learning to identify and predict plant hazards at a plant facility and hazard characteristics. In some embodiments, a plant safety manager collects structured safety data and unstructured data regarding various plant areas around a plant facility in order to predict plant hazards. In particular, plant facilities may be defined by specific geographic limitations with the respective plant facility to determine plant areas for performing hazard analyses. Using both the structured safety data and unstructured data, the plant safety manager may determine a hazard map that describes information regarding various plant hazards with respect to a geographical scope and functional areas within the plant. Thus, the plant safety manager may automatically infer insights, perform mitigation operations, and recommend various mitigation operations to avoid hazard incidents (e.g., where plant personnel or plant equipment are injured by a realized plant hazard). In some embodiments, hazard maps and other hazard analytics may be displayed on a central dashboard to provide insights and information regarding hazard situations at various plant facilities.

In some embodiments, machine-learning models are used to determine various plant hazards and their hazard characteristics. For example, a machine-learning model maybe a deep neural network with a support vector machine top layer that is trained using past and new hazard data to predict various plant hazards, e.g., situations where a possible danger exists for plant personnel and equipment based on a prediction of similar incidents occurring in the future. Thus, machine learning may augment human knowledge to predict safety data, identify potential plant hazards, classify risk levels associated with different plant hazards, weight various plant hazards, visualize them, and determine mitigation operations to remedy them accordingly.

Turning to FIG. 1, FIG. 1 shows a schematic diagram in accordance with one or more embodiments. As shown in FIG. 1, a plant management network (e.g., plant management network A (100)) may include various plant facilities (e.g., plant facility A (110), plant facility B (120)), such as a gas-oil separation plant (GOSP), a gas plant, a refinery, or another type of plant. The plant management network may include various user devices (e.g., user device M (130)), various servers, (e.g., plant safety manager X (160), inspection server N (170), maintenance server C (150)), and various network elements (not shown). Plant facilities may include plant equipment (e.g., plant device A (111)) and various control systems (e.g., control system A (112)). Plant equipment may be used to perform one or more plant processes, such as gas operations, unconventional resources operations, refining operations, and natural gas liquid (NGL) fractionation. However, other non-oil industries are also contemplated, such as automotive plants, chemical plants that produce polymer and other materials from chemical inputs, electric power plants, and metal manufacturing plants. The plant management network A (100) may be similar to network (630) described below in FIG. 6 and the accompanying description. User devices may include personal computers, handheld computer devices such as a smartphone or personal digital assistant, or a human machine interface (HMI). Plant devices may include storage tanks, heat exchangers, accumulators, boilers, pumps, inlet separators, coolers, evaporators, plant sensors, plant instruments, gauges, control switches, valves, emergency stop controls, pressure relief equipment, flaring equipment, smoke detectors, toxic gas detectors, thermal detectors, combustible gas detectors, electric power generators, turbines, exhaust fans, light panels, fume scrubbers, safety showers, and other plant equipment.

Furthermore, plant hazards may include physical hazards, fire hazards, explosive hazards, chemical hazards, biological hazards, and psychosocial hazards. A physical hazard may be an agent, factor, or circumstance that may cause harm based on a particular contact, and may be classified as an occupational hazard or an environmental hazard. An occupational hazard may be associated with specific worker occupations, while an environmental hazard may be associated with a person being around one or more specific environmental factors. Examples of environmental hazards may include radiation, vibrations, temperature, humidity, noise levels, and other physical conditions that may impact plant personnel at one or more environmental extremes. Biological hazards may include exposure to bacteria, viruses, fungi, or other harmful biological substances such as disease-related substances. An ergonomics hazard may be an occupational or a nonoccupational hazard with physical conditions that may pose risk of injury to the musculoskeletal system. Ergonomic hazards may correspond to physical conditions (e.g., a man-machine interface in a plant area) that may cause various anthropometric injuries (e.g., an injury based on the physical measures of a person's size, form and functional capacities). Chemical hazards may include exposure to one or more hazardous chemicals in a particular form, such as a solid, a liquid, a gas, vapors, fumes, mists, dust, or fibers. A fire hazard or an explosive hazard may describe a likelihood that a fire or explosion occurs in a specific proximity, respectively. Psychosocial hazards may be based on a combination of work-related experiences, such as stress, fatigue, bullying, violence, aggression, harassment and burnout, which can be harmful to worker health.

In some embodiments, a plant safety manager determines one or more hazard characteristics regarding one or more plant hazards. Hazard characteristics may include a hazard severity of a hazard incident (e.g., high severity, medium severity, low severity, etc.), a risk or probability that a hazard incident occurs, or a type of hazard. For example, hazard characteristics may describe a plant location, attributes of a hazard incident, and the number of people or the value of assets that may be affected by a particular hazard. Hazard characteristics may also specify a route of entry for a particular hazard, such as though inhalation, ingestion, skin penetration, injection, asphyxiation, or implantation. Hazard characteristics may also include vulnerability data that describes the likelihood that assets or plant personnel may be damaged or affected when a plant hazard incident occurs.

In some embodiments, a plant safety manager (e.g., plant safety manager X (160)) includes hardware and/or software with functionality for collecting and/or analyzing structured safety data (e.g., structured safety data X (161)) and/or unstructured data (e.g., unstructured data Y (162)) from a plant management network (e.g., user data (133), plant data A (191), maintenance data (192), inspection data (193)). Structured safety data may include safety performance indicators, such as overdue preventative maintenance, overdue inspections, safety scores, plant alarms, plant integrity window exceedances, and other structured data. For unstructured data, the plant safety manager may collect data records from different data sources, such as user devices, servers, and databases (e.g., database Y (166)) to infer insights about plant hazards in one or more plant areas, such as through machine learning. Examples of unstructured data sources may include user data, such as safety suggestions, compliance reports, site assessment reports, user-submitted innovative ideas, etc.

Rather than have a human analyst go through a million reports generated by plant facilities, a plant safety manager may include functionality for identifying potential plant hazards and hazard information. For example, the plant safety manager may identify hazard information for a plant facility, various plant areas at the plant facility, and specific plant equipment at a plant facility. Thus, a plant facility may gather and analyze millions of safety suggestions, near-miss reports, safety inspection records, unsafe condition data, and various narrative types in written records according to an 'unstructured' data format. In some embodiments, a plant safety manager uses one or more machine-learning models and/or one or more machine-learning algorithms to determine classified safety data from unstructured data.

In some embodiments, a plant safety manager includes one or more machine-learning models (e.g., machine-learning models Y (164)) that perform natural language processing to query large records and classify the hazard in each. For example, a plant manager may use natural language processing to "read" text (or another input such as speech) by simulating the human ability to understand a natural language (e.g., English or Chinese). Natural language processing (NLP) may be divided into functionality for natural language understanding and natural language generation. Natural language understanding (NLU) or nature language interpretation (NLI) includes various computer operations that perform text classification for use in an automated analysis of unstructured data, e.g., to determine classified safety data. For example, an NLU operation may use a large vocabulary to analyze text strings with diverse syntax to determine safety information. On the other hand, a natural language generation (NLG) operation may simulate the human ability to create natural language text to identify labels for one or more plant hazards associated with text from an unstructured data source. NLP operations may transform internal and external document formats (e.g. HTML, Word, PowerPoint, Excel, PDF text, PDF image) into a standardized searchable format for use by the plant safety manager. Thus, a plant safety manager may have the ability to identify, tag and search specific document sections to identify meaningful portions within text. A plant safety manager may also include various semantic tools that identify safety concepts within the text such as chemicals elements, biological elements, and physical injuries and their respective causes. In some embodiments, an NLP operation includes various types of pattern recognition to discover and identify categories of safety information, such as specific maintenance dates, specific inspection data, etc.

In some embodiments, a plant safety manager (e.g., plant safety manager X (160)) uses a machine-learning model (e.g., machine-learning models Y (164)) to determine a plant hazard. The machine-learning model may assign an initial weight to safety data, and subsequently categorize these safety data inputs based on various hazard characteristics, such as risk type, hazard type, and severity type. The machine-learning model may also determine whether a plant hazard is a direct contributor or an indirect contributor to a particular hazard incident for use by the plant safety manager. As such, machine learning may be used classify safety data and/or perform perspective analytics between current hazard trends and past hazard incidents to predict safety data (e.g., predict future hazard incidents, possible plant hazards and hazard characteristics). In other words, machine learning may be used to determine which plant areas are more susceptible to certain hazard types and determine mitigation operations based on how similar hazard incidents were addressed.

In some embodiments, a plant safety manager includes hardware and/or software with functionality for generating and/or using one or more machine-learning models (e.g., machine-learning models Y (164)) for use in analyzing safety data. For example, different types of machine-learning models may be trained, such as convolutional neural networks, deep neural networks, recurrent neural networks, support vector machines, decision trees, inductive learning models, deductive learning models, supervised learning models, unsupervised learning models, reinforcement learning models, etc. In some embodiments, two or more different types of machine-learning models are integrated into a single machine-learning architecture, e.g., a machine-learning model may include support vector machines and neural networks. In some embodiments, the plant safety manager may generate augmented data or synthetic data to produce a large amount of interpreted data for training a particular model.

In some embodiments, various types of machine learning algorithms (e.g., machine-learning algorithms X (163)) may be used to train the model, such as a backpropagation algorithm. In a backpropagation algorithm, gradients are computed for each hidden layer of a neural network in reverse from the layer closest to the output layer proceeding to the layer closest to the input layer. As such, a gradient may be calculated using the transpose of the weights of a respective hidden layer based on an error function (also called a "loss function"). The error function may be based on various criteria, such as mean squared error function, a similarity function, etc., where the error function may be used as a feedback mechanism for tuning weights in the machine-learning model (e.g., one of machine-learning models Y (164)).

With respect to neural networks, for example, a neural network may include one or more hidden layers, where a hidden layer includes one or more neurons. A neuron may be a modelling node or object that is loosely patterned on a neuron of the human brain. In particular, a neuron may combine data inputs with a set of coefficients, i.e., a set of network weights for adjusting the data inputs. These network weights may amplify or reduce the value of a particular data input, thereby assigning an amount of significance to various data inputs for a task being modeled. Through machine learning, a neural network may determine which data inputs should receive greater priority in determining one or more specified outputs of the neural network. Likewise, these weighted data inputs may be summed such that this sum is communicated through a neuron's activation function to other hidden layers within the neural network. As such, the activation function may determine whether and to what extent an output of a neuron progresses to other neurons where the output may be weighted again for use as an input to the next hidden layer.

Turning to recurrent neural networks, a recurrent neural network (RNN) may perform a particular task repeatedly for multiple data elements in an input sequence (e.g., a sequence of maintenance data or inspection data), with the output of the recurrent neural network being dependent on past computations (e.g., failure to perform maintenance or address an unsafe condition may produce one or more hazard incidents). As such, a recurrent neural network may operate with a memory or hidden cell state, which provides information for use by the current cell computation with respect to the current data input. For example, a recurrent neural network may resemble a chain-like structure of RNN cells, where different types of recurrent neural networks may have different types of repeating RNN cells. Likewise, the input sequence may be time-series data, where hidden cell states may have different values at different time steps during a prediction or training operation. For example, where a deep neural network may use different parameters at each hidden layer, a recurrent neural network may have common parameters in an RNN cell, which may be performed across multiple time steps. To train a recurrent neural network, a supervised learning algorithm such as a backpropagation algorithm may also be used. In some embodiments, the backpropagation algorithm is a backpropagation through time (BPTT) algorithm. Likewise, a BPTT algorithm may determine gradients to update various hidden layers and neurons within a recurrent neural network in a similar manner as used to train various deep neural networks. In some embodiments, a recurrent neural network is trained using a reinforcement learning algorithm such as a deep reinforcement learning algorithm. For more information on reinforcement learning algorithms, see the discussion below.

Embodiments are contemplated with different types of RNNs. For example, classic RNNs, long short-term memory (LSTM) networks, a gated recurrent unit (GRU), a stacked LSTM that includes multiple hidden LSTM layers (i.e., each LSTM layer includes multiple RNN cells), recurrent neural networks with attention (i.e., the machine-learning model may focus attention on specific elements in an input sequence), bidirectional recurrent neural networks (e.g., a machine-learning model that may be trained in both time directions simultaneously, with separate hidden layers, such as forward layers and backward layers), as well as multidimensional LSTM networks, graph recurrent neural networks, grid recurrent neural networks, etc. With regard to LSTM networks, an LSTM cell may include various output lines that carry vectors of information, e.g., from the output of one LSTM cell to the input of another LSTM cell. Thus, an LSTM cell may include multiple hidden layers as well as various pointwise operation units that perform computations such as vector addition.

In some embodiments, a plant safety manager uses one or more ensemble learning methods in connection to the machine-learning models. For example, an ensemble learning method may use multiple types of machine-learning models to obtain better predictive performance than available with a single machine-learning model. In some embodiments, for example, an ensemble architecture may combine multiple base models to produce a single machine-learning model. One example of an ensemble learning method is a BAGGing model (i.e., BAGGing refers to a model that performs Bootstrapping and Aggregation operations) that combines predictions from multiple neural networks to add a bias that reduces variance of a single trained neural network model. Another ensemble learning method includes a stacking method, which may involve fitting many different model types on the same data and using another machine-learning model to combine various predictions.

In some embodiments, a plant safety manager includes functionality for generating a hazard map (e.g., hazard maps X (165)) that describes one or more plant hazards at one or more plant areas of one or more plant facilities. For example, a hazard map may be presented in a similar manner as a heat map, where colors and other visual attributes may be used to show various hazard characteristics, such as hazard types, hazard risk levels, and/or severity levels of plant hazards. In some embodiments, one or more hazard maps are displayed within a graphical user interface, e.g., with multiple zoom-in/zoom-out capabilities to allow users to analyze plant facilities based on various metrics, (e.g., by process area, by risk type, etc.).

In some embodiments, a plant safety manager determines one or more mitigation operations using machine learning and/or one or more hazard maps. For example, a mitigation operation may identify a need for an additional detector (e.g., a gas detector for a hazardous chemical) and/or a replacement of an existing detector in a particular plant area. Another mitigation operation may include a change in protective equipment for plant personnel in one or more plant areas. In some embodiments, mitigation operations include lockout and/or tagout operations. For example, a lockout operation may cause plant equipment to be shut down and inoperable until a specific maintenance operation is performed (e.g., a component in the plant equipment is repaired). Thus, a mitigation operation may be automatically performed by a plant safety manager to protect plant personnel from hazardous equipment or machinery that could injure plant personnel if managed incorrectly. Likewise, mitigations operations may further include alerts and other notifications to users within a particular plant area that ensure users understand a given plant hazard and other hazard characteristics (e.g., a mitigation operation may identify on a user device or a human-machine interface a required use of a breathing apparatus). Another mitigation operation may include changes to emergency shutdown procedures based on changes in triggering conditions (e.g., failure of plant process device, loss of electrical power, loss of instrumentation, loss of containment, severe weather conditions, specific temperature or humidity levels, etc.) of the emergency shutdown procedure. Mitigation operations may also control entry of motorized equipment into various plant areas (e.g., after identifying a plant area as being an ignition-controlled plant area). Mitigation operations may also correspond to work order requests to ensure equipment deficiencies are addressed in a timely manner. While some examples of mitigation operations are contemplated, other mitigations are also contemplated for implementation over a plant management network, e.g., automatically by a plant safety manager.

Furthermore, a plant safety manager (e.g., plant safety manager X (160)) may also determine one or more mitigation operations using a mitigation schedule. More specifically, a plant safety manager may administer a mitigation schedule by determining when different mitigation operations are performed at a plant facility or among multiple plant facilities. After a plant hazard is detected with a high severity level, a plant safety manager may automatically push a respective mitigation operation to address the severe plant hazard early in a mitigation queue. On the other hand, a plant hazard may be detected with a low risk level and for a hazard type that is unlikely to result in significant injury to plant personnel. Thus, a plant safety manager may place a mitigation operation for the low-risk plant hazard lower in a mitigation queue or mitigation schedule depending on respective hazard characteristics.

Keeping with FIG. 1, some embodiments are implemented in various types of industrial plants with different types of plant operations. Examples of plants may include a refinery, a gas processing plant, a gas cycling plant, a compressor plant, and a gas-oil separation plant. However, various non-petrochemical plants are also contemplated, such as manufacturing plants, other types of chemical plants, and other facilities that may have hazardous conditions. With respect to control systems, control systems may include a programmable logic controller (PLC), a distributed control system (DCS), a supervisory control and data acquisition (SCADA), and/or a remote terminal unit (RTU). For example, a programmable logic controller may control valve states, fluid levels, pipe pressures, warning alarms, and/or pressure releases throughout a plant facility. In particular, a programmable logic controller may be a ruggedized computer system with functionality to withstand vibrations, extreme temperatures, wet conditions, and/or dusty conditions, for example, around a refinery. A distributed control system may be a computer system for managing various processes at a plant facility using multiple control loops. As such, a distributed control system may include various autonomous controllers (such as remote terminal units) positioned at different locations throughout the facility to manage operations and monitor processes. Likewise, a distributed control system may include no single centralized computer for managing control loops and other operations. On the other hand, a SCADA system may include a control system that includes functionality for enabling monitoring and issuing of process commands through local control at a facility as well as remote control outside the facility. With respect to an RTU, an RTU may include hardware and/or software, such as a microprocessor, that connects sensors and/or actuators using network connections to perform various processes in the automation system. Likewise, a control system may be coupled to one or more plant devices.

In some embodiments, a user device (e.g., user device M (130)) may communicate with a plant safety manager to generate one or more hazard maps (e.g., based on plant hazards and/or hazard characteristics) based on one or more user selections (e.g., user selections N (131)). For example, a user may interact with a user interface (e.g., user interface O (132)) to change thresholds for different safety levels or request information regarding various hazard characteristics. Through user selections or automation, the plant safety manager may provide hazard reports for different plant facilities, different plant areas, and other information in a graphical user interface regarding safety data.

In some embodiments, the plant safety manager includes functionality for transmitting commands (e.g., command Y (195) is transmitted to a control system in plant facility B (120)) to one or more user devices and/or control systems to implement a particular mitigation operation. For example, the plant safety manager X (160) may transmit a network message over a machine-to-machine protocol to the control system A (112). A command may be transmitted based on a user input or automatically based on changes in plant hazard conditions, e.g., after analyzing new structured safety data or unstructured data.

While FIG. 1 shows various configurations of components, other configurations may be used without departing from the scope of the disclosure. For example, various components in FIG. 1 may be combined to create a single component. As another example, the functionality performed by a single component may be performed by two or more components.

Figure 2:
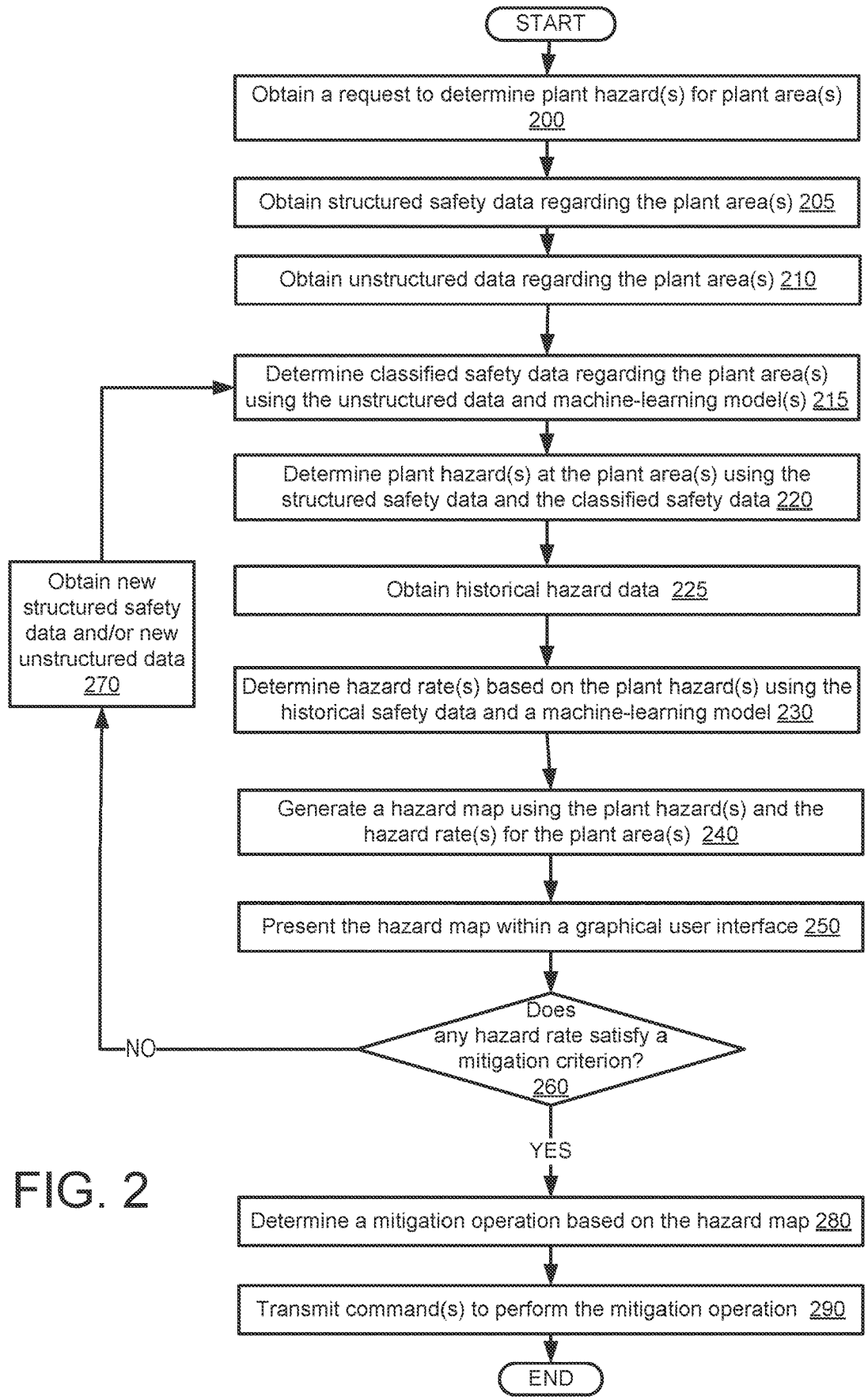
FIG. 2 shows a flowchart in accordance with one or more embodiments.

Turning to FIG. 2, FIG. 2 shows a flowchart in accordance with one or more embodiments. Specifically, FIG. 2 describes a general method for generating and/or using a hazard map. One or more blocks in FIG. 2 may be performed by one or more components (e.g., plant safety manager X (160)) as described in FIG. 1. While the various blocks in FIG. 2 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 200, a request is obtained to determine one or more plant hazards for one or more plant areas in accordance with one or more embodiments. For example, a user may transmit a request in response to a user input provided to a user device. The request may be a network message transmitted between a user device and a plant safety manager that identifies information desired for a specific plant, e.g., a hazard map that describes the plant areas at the plant facility. On the other hand, a request may also be a network message specific to one or more plant areas, which may include desired plant areas that a user is interested in performing a hazard analysis. For example, a request may be a message from a user to determine various types of hazards and a hazard level associated with plant area A in plant facility X.

In Block 205, structured safety data are obtained regarding one or more plant areas in accordance with one or more embodiments. For example, structured safety data may be organized in a predetermined format with one or more attributes, e.g., date and time, equipment type, or hazard type. Likewise, structured safety data may be organized according to various safety record attributes (e.g., Occupational Safety and Health Administration (OSHA) records) that include attributes based on casualties, injuries, near misses, illness ratios, etc.

In Block 210, unstructured data are obtained regarding one or more plant areas in accordance with one or more embodiments. For example, a plant safety manager may use text mining and other data extraction techniques to obtain narrative data from various unstructured data sources, such as maintenance logs, inspection reports, user suggestions, etc. Unstructured data sources may include various data repositories such as shared folders, intranets, or a document management system that enables users to store electronic records centrally. Thus, a plant safety manager may read inspection reports, user ideas, safety reports, and employee safety suggestions and unstructured inputs to infer a potential hazard and hazard characteristics. For more information on unstructured data, see unstructured data described above in FIG. 1 and the accompanying description.

In some embodiments, unstructured data is obtained using one or more robotic process automation (RPA) techniques. An RPA technique may be a form of business process automation technology that uses various software robots ("bots") or artificial intelligence workers to gather the input files and place them in a central repository. An RPA instance may be generated by a plant safety manager with its own virtual workstation, similar to a workstation for a human worker. As such, the RPA instance may use keyboard and mouse controls to take actions and execute automations. However, RPA instances may operate in a virtual machine environment without an actual screen or graphical user interface. In other words, the RPA instance may not need a physical screen to interpret screen display data electronically. Examples of RPA techniques may include data scraping, image recognition, and pattern recognition. RPA techniques may also be referred to as "software robotics."

In Block 215, classified safety data are determined regarding one or more plant areas using unstructured data and one or more machine-learning models in accordance with one or more embodiments. In some embodiments, a machine-learning model operates as a classifier to learn the importance of unstructured data from different data sources. Furthermore, the machine-learning model may be a natural language processing model that generates classified safety data from the input unstructured data. For example, an NLP model may read through text narratives that are input to the model in order to develop insights within the text, e.g., what type of hazard a user is providing a warning about.

In Block 220, one or more plant hazards are determined at one or more plant areas using structured safety data and classified safety data in accordance with one or more embodiments. For illustration, safety data (such as classified safety data from an NPL model) may correspond to various input features to an input layer, while the machine-learning model may include a deep neural network with a support vector machine (SVM) and a Bayesian network that generates predicted safety data. For example, the machine-learning model may have a linear SVM top layer instead of a softmax layer. Thus, the SVM and respective gradients may be backpropagated to train the machine-learning model on lower level features. With quarterly safety inspection (QSI) reports, for example, a machine-learning model may generate insights to produce predicted safety data. By identifying plant devices, environmental conditions (e.g., wet conditions), and the type of worker operations in a particular plant area, a plant safety manager may determine an electrical hazard is present in the plant area.

In some embodiments, a plant safety manager uses a risk weightage model that is trained with actual hazard incidents. Thus, the predicted safety data may be based on one or more weighting factors with respect to the underlying data source, e.g., to determine plant hazards and corresponding hazard characteristics. For example, predicted safety data may correspond to a plant hazard that is weighted based on a type of procedure, an amount of safety compliance, knowledge, job-site safety institute (JSI) data, and various other factors such as management factors, isolation of hazard incidents, work permits, and other weighting criteria.

Furthermore, the machine-learning model may output a specific plant hazard, which may be grouped by plant location (e.g., in a specific plant area), hazard type, hazard rate of occurrence, hazard frequency, etc. Given a set of training examples, the machine-learning model may group a particular plant hazard to different hazard categories, where new plant hazards may be assigned to new examples to one of the hazard categories. In some embodiments, a machine-learning model begins a classification operation that is followed by an aggregation/weighting operation of multiple plant hazards In Block 225, historical hazard data are obtained in accordance with one or more embodiments. Historical hazard data may describe past hazard incidents on one or more plant facilities. For example, historical hazard data may identify the number of plant personnel injured in a hazard incident, types of injuries associated with the hazard incident, the amount of damage from the hazard incident, and the type of hazard (e.g., chemical hazard, electrical hazard, physical hazard, etc.) associated with the hazard incident. Historical hazard data may also include frequency information, such as how many hazard incidents have occurred at a particular plant area, plant facility, or particular types of plant areas or plant facilities.

In Block 230, one or more hazard rates are determined based on one or more plant hazards using historical safety data and a machine-learning model in accordance with one or more embodiments. With respect to a particular plant hazard, machine learning may be used to determine various hazard characteristics, such as a hazard rate or severity level of the plant hazard. In particular, a hazard rate may describe a frequency that a hazard incident may occur in the absence of one or more mitigation operations. For example, hazard incidents may increase over time as the hazard situation in a plant area increases. Likewise, hazard rates may also be predicted for a plant area or plant facility following one or more mitigation operations. In other words, a plant safety manager may determine different types of hazard rates, such as historical hazard rates based on historical hazard data, a future hazard rate given current conditions, and a mitigated hazard rate based on performing one or more mitigation operations.

In Block 240, a hazard map is generated using one or more plant hazards and one or more hazard rates for one or more plant areas in accordance with one or more embodiments. For example, plant hazards, hazard characteristics, hazard rates, and other hazard information may be illustrated in a hazard map, e.g., within a graphical user interface on a user device. The hazard map may be organized according to one or more plant facilities, where the plant facilities are divided according to plant areas. In some embodiments, a hazard map includes one or more alerts identifying various hazard areas that may require one or more mitigation operations, for example.

Figure 3:
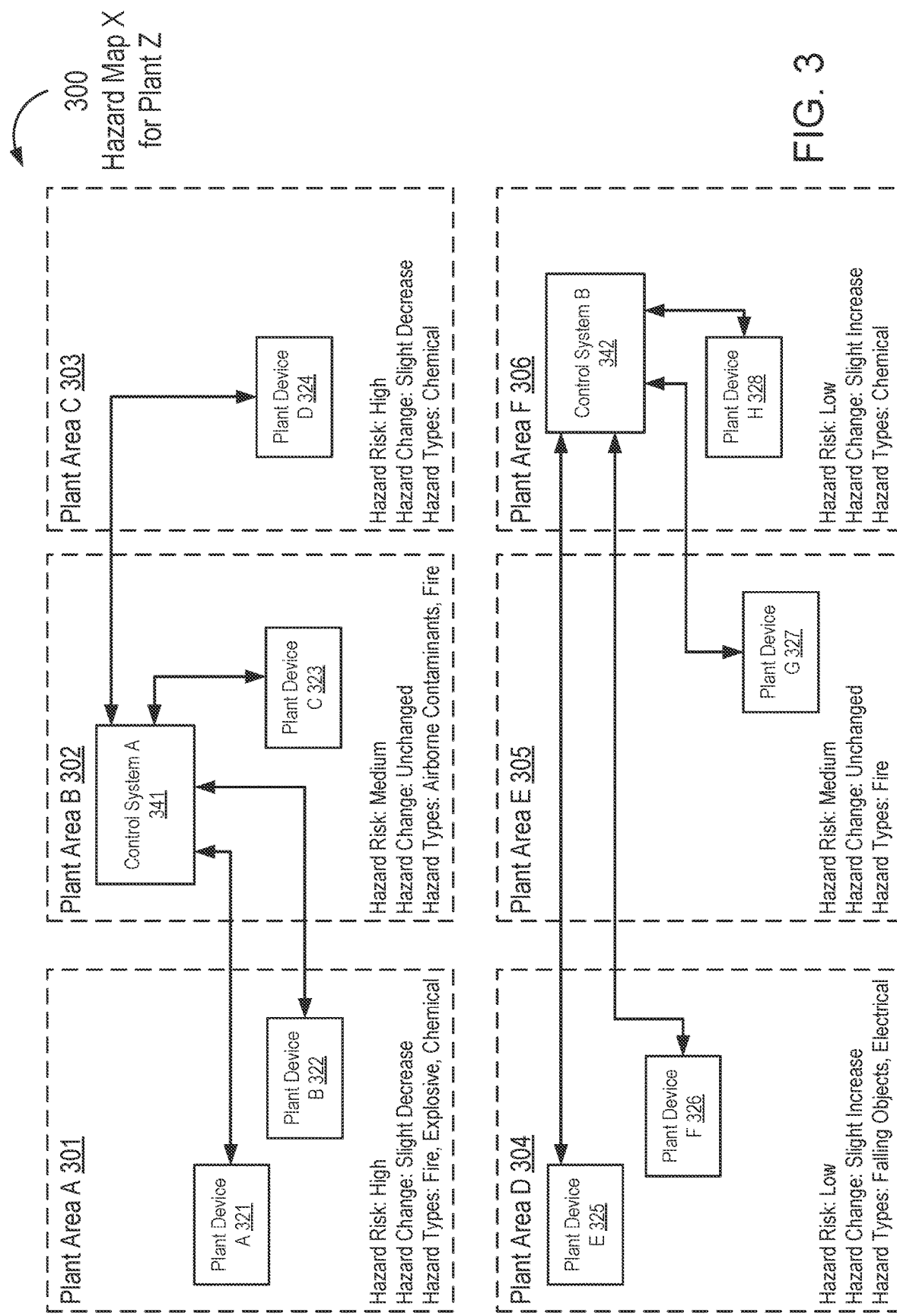
FIGS. 3, 4, and 5 shows examples in accordance with one or more embodiments.
Figure 4:
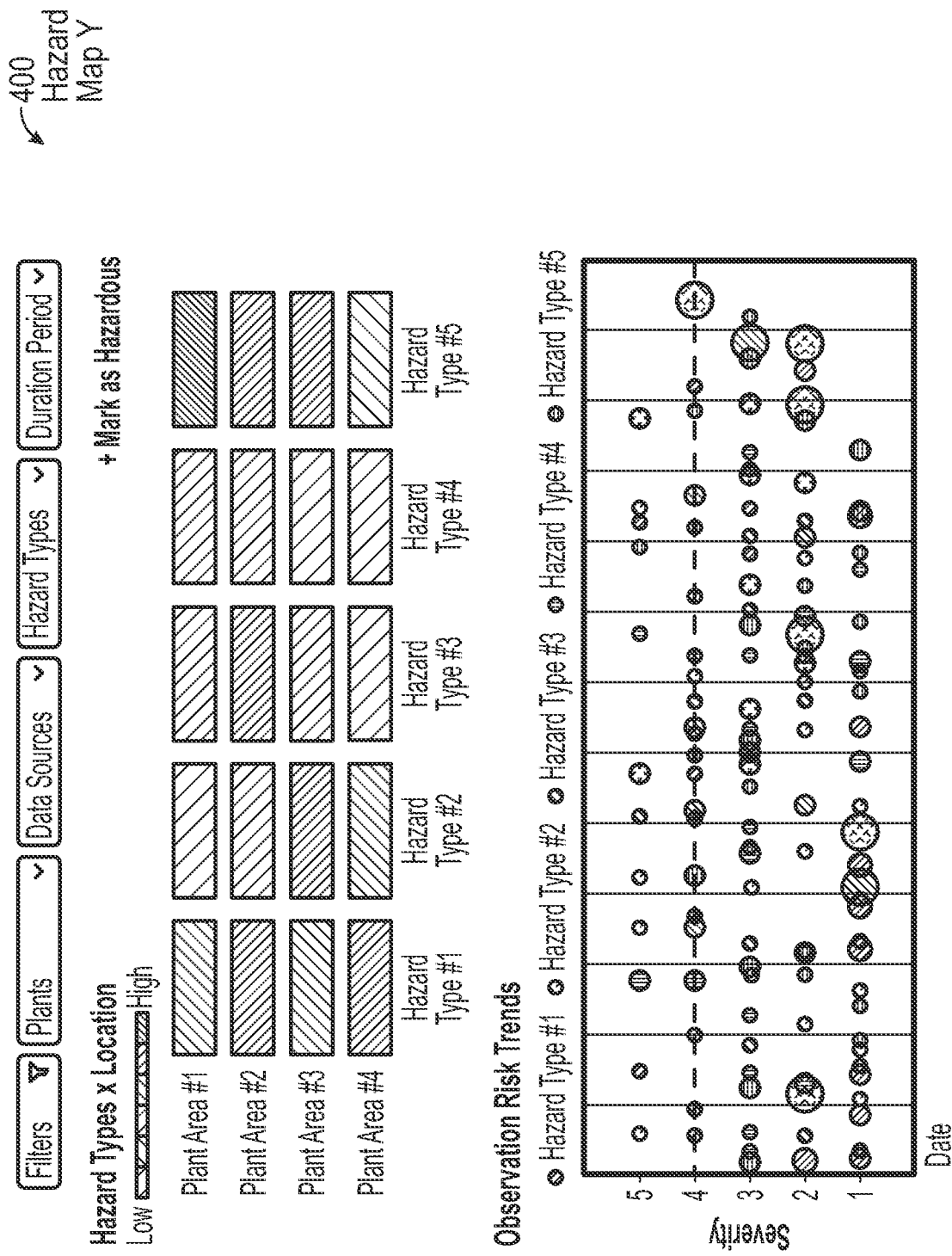

Turning to FIGS. 3 and 4, FIGS. 3 and 4 illustrate examples hazard maps in accordance with one or more embodiments. The following examples are for explanatory purposes only and not intended to limit the scope of the disclosed technology. In FIG. 3, a hazard map X (300) for plant Z is shown, which includes various plant areas, i.e., plant area A (301), plant area B (302), plant area C (303), plant area D (304), plant area E (305), and plant area F (306). As shown in hazard map X (300), various plant devices (i.e., plant device A (321), plant device B (322), plant device C (323), plant device D (324), plant device E (325), plant device F (326), plant device G (327), plant device H (328)) are distributed in the plant areas (301, 302, 303, 304, 305, 306) along with various control systems (i.e., control system A (341), control system B (342)) for managing the plant equipment. For plant area A (301), a plant safety manager (not shown) uses structured safety data and unstructured data to determine various hazard characteristics, such as the hazard risk level being 'high', the hazard change having a slight decrease from previously collected data, and the hazard types existing in the respective plant area being fire hazards, explosive hazards, and chemical hazards.

In FIG. 4, a hazard map Y (400) is shown that includes various hazard analytics being performed on safety data and historical hazard data. For example, the hazard map Y (400) identifies the following hazard types: slip, trip, and fall hazards, contact with chemical hazards, fire and explosion hazards, and electric hazards. Accordingly, different plant units (e.g., utilities and cogeneration unit, inlet and gas treatment unit, etc.) are assigned different hazard risk levels based on a particular type of hazard. Furthermore, hazard map Y (400) also shows various observation risk trends. As shown in FIG. 4, various types of hazard incidents and their corresponding number of incidents are analyzed with respect to a severity alert threshold of a level '4' severity, such that larger solid circles indicate a larger number of incidents.

Returning to FIG. 2, in Block 250, a hazard map is presented within a graphical user interface in accordance with one or more embodiments.

In Block 260, a determination is made whether any hazard rate satisfies a mitigation criterion in accordance with one or more embodiments. For example, a plant safety manager may analyze a hazard map or a plant hazard to determine whether either satisfies a mitigation criterion. Once a mitigation criterion is satisfied, the plant safety manager may automatically trigger one or more mitigation operations based on the mitigation criterion or particular plant hazard. For example, mitigation criterion may correspond to a severity alert threshold. Likewise, the mitigation criterion may be based on a predicted number of hazard incidents, a particular severity level or a hazard rate for a particular plant area. Likewise, a mitigation criterion may correspond to one or more aggregate hazard levels for a plant facility. For example, a mitigation criterion may be based on whether a mitigation operation would reduce an overall hazard level of a plant facility. If a mitigation criterion is satisfied for at least one plant hazard, the process may proceed to Block 280. If no plant hazard satisfies a mitigation criterion, the process may proceed to Block 270.

In Block 270, new structured safety data and/or new unstructured data are obtained in accordance with one or more embodiments. For example, the plant safety manager may periodically monitor structured safety data and unstructured data to detect any hazard changes in any plant areas.

In Block 280, a mitigation operation is determined based on a hazard map and a machine-learning model in accordance with one or more embodiments. For example, a plant safety manager may provide various recommended actions based on different plant hazards, e.g., analyzing mitigation operation data for analogous and similar hazard incidents. On the other hand, a plant safety manager may automatically implement a mitigation operation without a human user making a mitigation operation selection, e.g., using a mitigation criterion.

In some embodiments, for example, a plant safety manager may determine one or more operations that may reduce a hazard level (e.g., the risk that a hazard incident occurs based on a hazard risk, reducing the severity of a hazard incident should one occur, or eliminate the plant hazard altogether) for each plant area. Using another machine-learning model, for example, a plant safety manager may use historical hazard data, plant data (e.g., types of plant equipment and plant work operations), and mitigation operation data to determine one or more operations to address the root cause of a respective plant hazard. In other words, a plant safety manager may address root causes of past incidents and initiate mitigation operations to address new emerging issues.

In Block 290, a command is transmitted to perform a mitigation operation in accordance with one or more embodiments. In response to generating a hazard map, for example, a plant safety manager may automatically transmit one or more commands to initiate a mitigation operation. For example, the command may be transmitted to a control system to adjust one or more control system parameters. Likewise, the plant safety manager may initiate work orders to repair or replace plant equipment. In some embodiments, a plant safety manager uses a mitigation schedule to determine a series of mitigation operations to address plant hazard at an aggregate level at one or more plant facilities.

Figure 5:
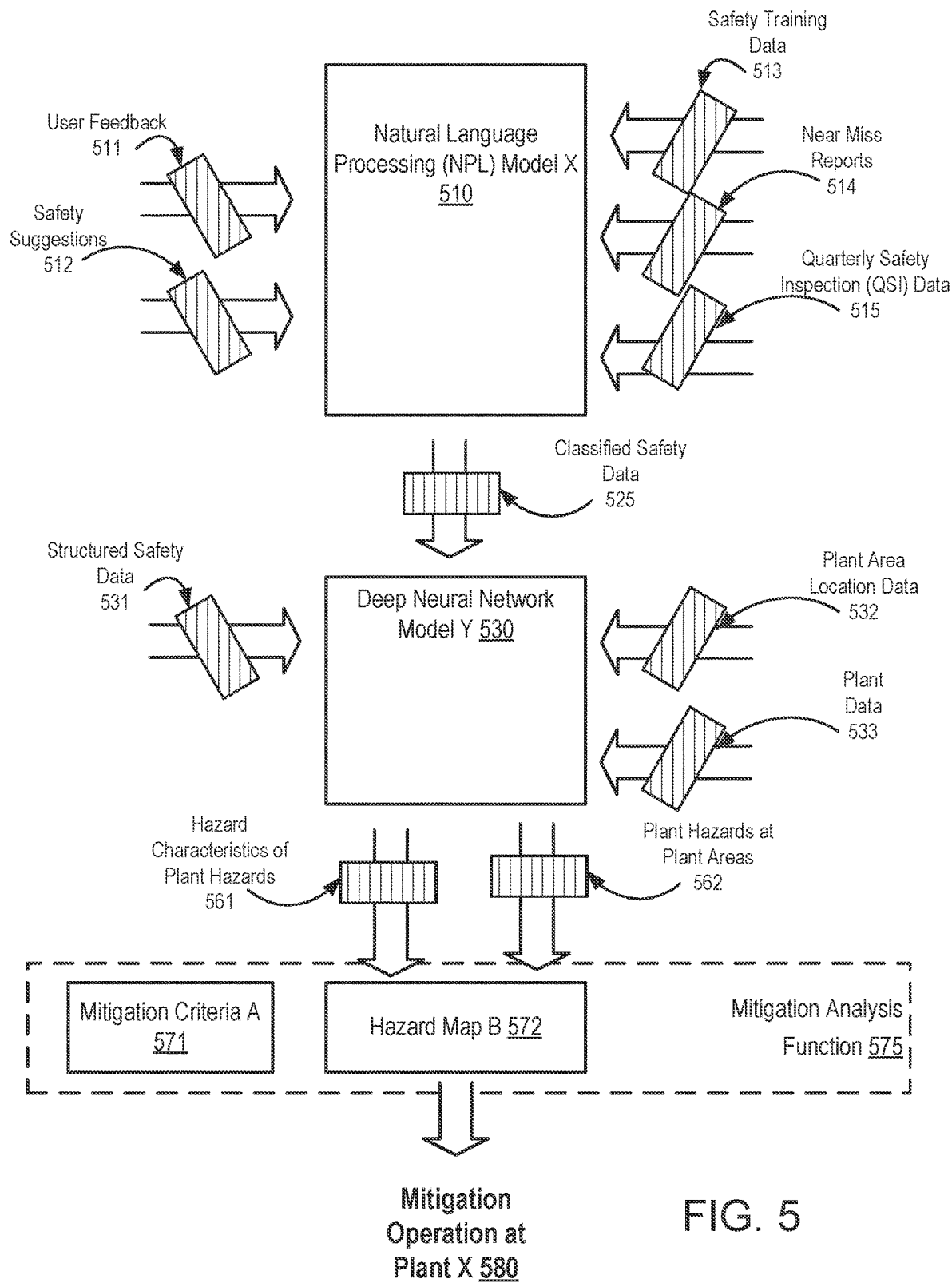
Figure 6:
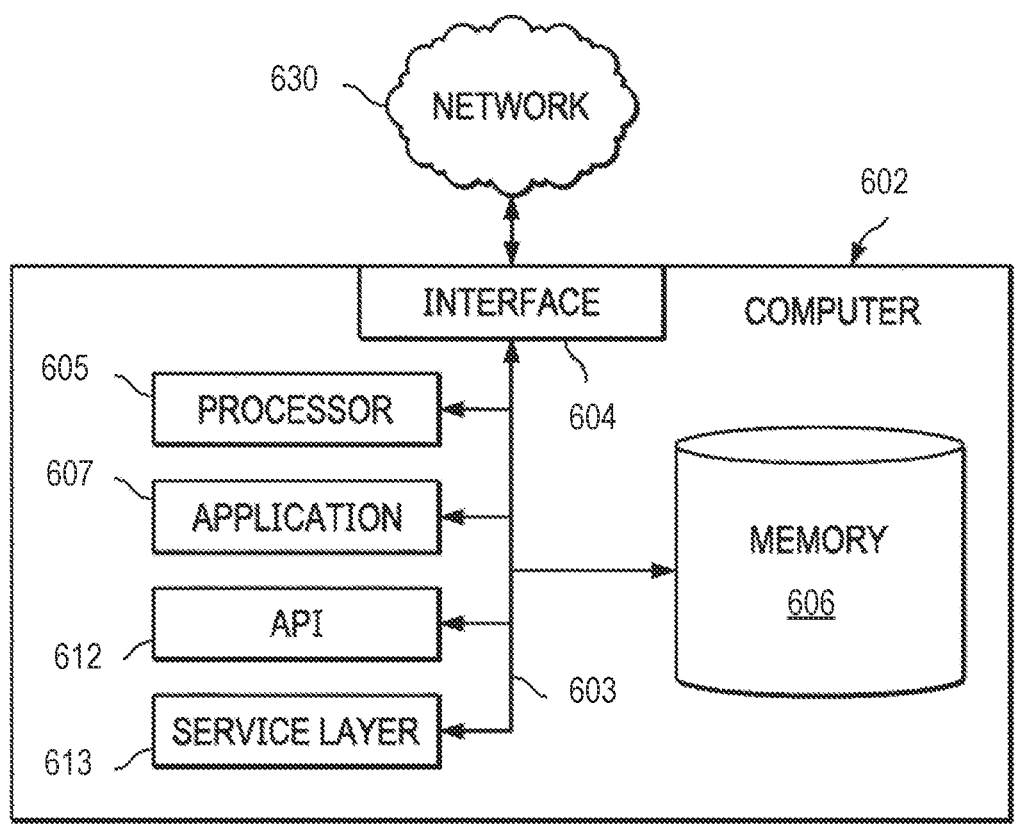
FIG. 6 shows a computer system in accordance with one or more embodiments.

Turning to FIG. 5, FIG. 5 illustrates an example of generating a mitigation operation based on a hazard map in accordance with one or more embodiments. The following example is for explanatory purposes only and not intended to limit the scope of the disclosed technology. In FIG. 5, a plant safety manager (not shown) obtains various unstructured data, i.e., user feedback (511), safety suggestions (512) from users, safety training data (513), near miss reports (514), and quarterly safety inspection (QSI) data (515). Using a natural language processing (NPL) model X (510), the plant safety manager determines classified safety data (525) from the unstructured data. The classified safety data (525) is then used as an input to a deep neural network model Y (530) along with structured safety data (531), plant area location data (532), and plant data (533). The output of the deep neural network model Y (530) includes predicted safety data, such as plant hazards (562) at respective plant areas and hazard characteristics (561) of the plant hazards. The plant safety manager uses the hazard characteristics (561) and the plant hazards to generate a hazard map B (572). The plant safety manager then performs a mitigation analysis function (575) on the hazard map B (572) and mitigation criteria A (571) to determine a mitigation operation (580) at plant X to address one or more of the plant hazards (562). The mitigation analysis function (575) may also be based on machine-learning perspective analytics. For example, the mitigation analysis function (575) may include a deep neural network or another type of machine-learning model Embodiments may be implemented on a computer system. FIG. 6 is a block diagram of a computer system (602) used to provide computational functionalities associated with described algorithms, methods, functions, processes, flows, and procedures as described in the instant disclosure, according to an implementation. The illustrated computer (602) is intended to encompass any computing device such as a high performance computing (HPC) device, server, desktop computer, laptop/notebook computer, wireless data port, smart phone, personal data assistant (PDA), tablet computing device, one or more computer processors within these devices, or any other suitable processing device, including both physical or virtual instances (or both) of the computing device. Additionally, the computer (602) may include a computer that includes an input device, such as a keypad, keyboard, touch screen, or other device that can accept user information, and an output device that conveys information associated with the operation of the computer (602), including digital data, visual, or audio information (or a combination of information), or a GUI.

The computer (602) can serve in a role as a client, network component, a server, a database or other persistency, or any other component (or a combination of roles) of a computer system for performing the subject matter described in the instant disclosure. The illustrated computer (602) is communicably coupled with a network (630). In some implementations, one or more components of the computer (602) may be configured to operate within environments, including cloud-computing-based, local, global, or other environment (or a combination of environments).

At a high level, the computer (602) is an electronic computing device operable to receive, transmit, process, store, or manage data and information associated with the described subject matter. According to some implementations, the computer (602) may also include or be communicably coupled with an application server, e-mail server, web server, caching server, streaming data server, business intelligence (BI) server, or other server (or a combination of servers).

The computer (602) can receive requests over network (630) from a client application (for example, executing on another computer (602)) and responding to the received requests by processing the said requests in an appropriate software application. In addition, requests may also be sent to the computer (602) from internal users (for example, from a command console or by other appropriate access method), external or third-parties, other automated applications, as well as any other appropriate entities, individuals, systems, or computers.

Each of the components of the computer (602) can communicate using a system bus (603). In some implementations, any or all of the components of the computer (602), both hardware or software (or a combination of hardware and software), may interface with each other or the interface (604) (or a combination of both) over the system bus (603) using an application programming interface (API) (612) or a service layer (613) (or a combination of the API (612) and service layer (613). The API (612) may include specifications for routines, data structures, and object classes. The API (612) may be either computer-language independent or dependent and refer to a complete interface, a single function, or even a set of APIs. The service layer (613) provides software services to the computer (602) or other components (whether or not illustrated) that are communicably coupled to the computer (602). The functionality of the computer (602) may be accessible for all service consumers using this service layer. Software services, such as those provided by the service layer (613), provide reusable, defined business functionalities through a defined interface. For example, the interface may be software written in JAVA, C++, or other suitable language providing data in extensible markup language (XML) format or other suitable format. While illustrated as an integrated component of the computer (602), alternative implementations may illustrate the API (612) or the service layer (613) as stand-alone components in relation to other components of the computer (602) or other components (whether or not illustrated) that are communicably coupled to the computer (602). Moreover, any or all parts of the API (612) or the service layer (613) may be implemented as child or sub-modules of another software module, enterprise application, or hardware module without departing from the scope of this disclosure.

The computer (602) includes an interface (604). Although illustrated as a single interface (604) in FIG. 6, two or more interfaces (604) may be used according to particular needs, desires, or particular implementations of the computer (602). The interface (604) is used by the computer (602) for communicating with other systems in a distributed environment that are connected to the network (630). Generally, the interface (604 includes logic encoded in software or hardware (or a combination of software and hardware) and operable to communicate with the network (630). More specifically, the interface (604) may include software supporting one or more communication protocols associated with communications such that the network (630) or interface's hardware is operable to communicate physical signals within and outside of the illustrated computer (602).

The computer (602) includes at least one computer processor (605). Although illustrated as a single processor (605) in FIG. 6, two or more computer processors may be used according to particular needs, desires, or particular implementations of the computer (602). Generally, the computer processor (605) executes instructions and manipulates data to perform the operations of the computer (602) and any algorithms, methods, functions, processes, flows, and procedures as described in the instant disclosure.

The computer (602) also includes a memory (606) that holds data for the computer (602) or other components (or a combination of both) that can be connected to the network (630). For example, memory (606) can be a database storing data consistent with this disclosure. Although illustrated as a single memory (606) in FIG. 6, two or more memories may be used according to particular needs, desires, or particular implementations of the computer (602) and the described functionality. While memory (606) is illustrated as an integral component of the computer (602), in alternative implementations, memory (606) can be external to the computer (602).

The application (607) is an algorithmic software engine providing functionality according to particular needs, desires, or particular implementations of the computer (602), particularly with respect to functionality described in this disclosure. For example, application (607) can serve as one or more components, modules, applications, etc. Further, although illustrated as a single application (607), the application (607) may be implemented as multiple applications (607) on the computer (602). In addition, although illustrated as integral to the computer (602), in alternative implementations, the application (607) can be external to the computer (602).

There may be any number of computers (602) associated with, or external to, a computer system containing computer (602), each computer (602) communicating over network (630). Further, the term "client," "user," and other appropriate terminology may be used interchangeably as appropriate without departing from the scope of this disclosure. Moreover, this disclosure contemplates that many users may use one computer (602), or that one user may use multiple computers (602).

In some embodiments, the computer (602) is implemented as part of a cloud computing system. For example, a cloud computing system may include one or more remote servers along with various other cloud components, such as cloud storage units and edge servers. In particular, a cloud computing system may perform one or more computing operations without direct active management by a user device or local computer system. As such, a cloud computing system may have different functions distributed over multiple locations from a central server, which may be performed using one or more Internet connections. More specifically, cloud computing system may operate according to one or more service models, such as infrastructure as a service (IaaS), platform as a service (PaaS), software as a service (SaaS), mobile "backend" as a service (MBaaS), serverless computing, and/or function as a service (FaaS).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any meansplus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

What is claimed:

1. A method, comprising:
   obtaining, by a computer processor and from a user device, a request to determine a first plant hazard regarding a first plant area at a plant facility;
   obtaining, by the computer processor, first structured safety data and unstructured data regarding the first plant area, wherein the first structured safety data comprises maintenance data and inspection data regarding the first plant area, and wherein the unstructured data comprises user-submitted data regarding at least one compliance report and at least one site assessment report;
   determining, by the computer processor, first classified safety data regarding the first plant area using the unstructured data and a first machine-learning model that uses natural language processing;
   determining, by the computer processor, a first plant hazard for the first plant area using a second machine-learning model, the first classified safety data, and the first structured safety data, wherein the second machine-learning model is configured to determine predicted safety data;
   obtaining, by the computer processor, historical hazard data for a plurality of plant facilities;
   determining, by the computer processor, a hazard rate for the first plant area based on the first plant hazard and the historical hazard data;
   generating, by the computer processor and within a graphical user interface on the user device, a hazard map for the plant facility, wherein the hazard map identifies the first plant hazard and the hazard rate in association with the first plant area;
   determining, by the computer processor automatically in response to the hazard rate failing to satisfy a mitigation criterion, a mitigation operation for the first plant hazard; and
   performing the mitigation operation by transmitting, by the computer processor, a first command to a control system to perform the mitigation operation.

2. The method of claim 1,
   wherein the first machine-learning model is a recurrent neural network model,
   wherein the second machine-learning model is a deep neural network model comprising a support vector machine layer, and
   wherein the deep neural network model is trained using a backpropagation algorithm.

3. The method of claim 1, further comprising:
   determining, by the computer processor, a plurality of respective hazards for a plurality of respective plant locations at the plant facility;
   determining, by the computer processor, a plurality of respective hazard rates for the plurality of respective hazards using second historical hazard data;
   determining, by the computer processor, a hazard level for the plant facility using the plurality of respective hazards and the plurality of respective hazard rates;
   determining, by the computer processor and based on the hazard level, a mitigation schedule comprising a plurality of mitigation operations, wherein the mitigation schedule is configured to reduce the hazard level for the plant facility below a predetermined threshold; and
   transmitting, by the computer processor and automatically based on the mitigation schedule, a plurality of commands to one or more control systems to implement the mitigation schedule.

4. The method of claim 1, further comprising:
   determining, by the computer processor, a second plant hazard for a second plant area using the second machine-learning model, second classified safety data, and second structured safety data;
   determining, by the computer processor, a plurality of mitigation operations for the second plant hazard;
   presenting, by the computer processor, the plurality of mitigation operations within the graphical user interface in the user device;
   obtaining, by the computer processor and from the user device, a selection of at least one of the plurality of mitigation operations; and
   transmitting, by the computer processor and in response to the selection of the at least one of the plurality of mitigation operations, a second command that implements that at least one of the plurality of mitigation operations.

5. The method of claim 1, further comprising:
   associating, by the computer processor and using a third machine-learning model, a plurality of hazards with a plurality of plant incidents at the plurality of plant facilities and a plurality of work orders to determine the historical hazard data,
   wherein the hazard rate of the first plant hazard is based on the historical hazard data that corresponds to a hazard among the plurality of hazards that is the same as the first plant hazard.

6. The method of claim 1,
   wherein the first plant hazard is selected from a group consisting of a chemical hazard, an electrical hazard, a physical hazard, a biological hazard, a fire hazard, and an exploding hazard.

7. The method of claim 1,
   wherein the first plant hazard is determined using a plant safety manager operating on a plant management network.

8. A server, comprising:
   a computer processor; and
   a memory coupled to the computer processor, wherein the memory comprises functionality for:
   obtaining, from a user device, a request to determine a first plant hazard regarding a first plant area at a plant facility;
   obtaining first structured safety data and unstructured data regarding the first plant area, wherein the first structured safety data comprises maintenance data and inspection data regarding the first plant area, and wherein the unstructured data comprises user-submitted data regarding at least one compliance report and at least one site assessment report;
   determining first classified safety data regarding the first plant area using the unstructured data and a first machine-learning model that uses natural language processing;

determining a first plant hazard for the first plant area using a second machine-learning model, the first classified safety data, and the first structured safety data, wherein the second machine-learning model is configured to determine predicted safety data;

obtaining historical hazard data for a plurality of plant facilities;

determining a hazard rate for the first plant area based on the first plant hazard and the historical hazard data;

generating, within a graphical user interface on the user device, a hazard map for the plant facility, wherein the hazard map identifies the first plant hazard and the hazard rate in association with the first plant area;

determining, automatically in response to the hazard rate failing to satisfy a mitigation criterion, a mitigation operation for the first plant hazard; and performing the mitigation operation by transmitting a first command to a control system to perform the mitigation operation.

9. The server of claim 8, wherein the first machine-learning model is a recurrent neural network model, wherein the second machine-learning model is a deep neural network model comprising a support vector machine layer, and wherein the deep neural network model is trained using a backpropagation algorithm.

10. The server of claim 8, wherein the memory further comprises functionality for:

determining a plurality of respective hazards for a plurality of respective plant locations at the plant facility;

determining a plurality of respective hazard rates for the plurality of respective hazards using second historical hazard data;

determining a hazard level for the plant facility using the plurality of respective hazards and the plurality of respective hazard rates;

determining, based on the hazard level, a mitigation schedule comprising a plurality of mitigation operations, wherein the mitigation schedule is configured to reduce the hazard level for the plant facility below a predetermined threshold; and transmitting, automatically based on the mitigation schedule, a plurality of commands to one or more control systems to implement the mitigation schedule.

11. The server of claim 8, wherein the memory further comprises functionality for:

determining a second plant hazard for a second plant area using the second machine-learning model, second classified safety data, and second structured safety data;

determining a plurality of mitigation operations for the second plant hazard;

presenting the plurality of mitigation operations within the graphical user interface in the user device;

obtaining, from the user device, a selection of at least one of the plurality of mitigation operations; and transmitting, in response to the selection of the at least one of the plurality of mitigation operations, a second command that implements that at least one of the plurality of mitigation operations.

12. The server of claim 8, wherein the memory further comprises functionality for:

associating, using a third machine-learning model, a plurality of hazards with a plurality of plant incidents at the plurality of plant facilities and a plurality of work orders to determine the historical hazard data, wherein the hazard rate of the first plant hazard is based on the historical hazard data that corresponds to a hazard among the plurality of hazards that is the same as the first plant hazard.

13. The server of claim 8, wherein the first plant hazard is selected from a group consisting of a chemical hazard, an electrical hazard, a physical hazard, a biological hazard, a fire hazard, and an exploding hazard.

14. A system, comprising:

a plurality of user devices;

a control system;

a plurality of plant devices coupled to the control system; and a server coupled to the plurality of user device and the control system, wherein the server comprises functionality for:

obtaining, from the plurality of user devices, a request to determine a first plant hazard regarding a first plant area at a plant facility;

obtaining first structured safety data and unstructured data regarding the first plant area, wherein the first structured safety data comprises maintenance data and inspection data regarding the first plant area, and wherein the unstructured data comprises user-submitted data regarding at least one compliance report and at least one site assessment report;

determining first classified safety data regarding the first plant area using the unstructured data and a first machine-learning model that uses natural language processing;

determining a first plant hazard for the first plant area using a second machine-learning model, the first classified safety data, and the first structured safety data, wherein the second machine-learning model is configured to determine predicted safety data;

obtaining historical hazard data for a plurality of plant facilities;

determining a hazard rate for the first plant area based on the first plant hazard and the historical hazard data;

generating, within a graphical user interface on the user device, a hazard map for the plant facility, wherein the hazard map identifies the first plant hazard and the hazard rate in association with the first plant area;

determining, automatically in response to the hazard rate failing to satisfy a mitigation criterion, a mitigation operation for the first plant hazard; and performing the mitigation operation by transmitting a first command to the control system to perform the mitigation operation.

15. The system of claim 14, wherein the first machine-learning model is a recurrent neural network model, wherein the second machine-learning model is a deep neural network model comprising a support vector machine layer, and wherein the deep neural network model is trained using a backpropagation algorithm.

16. The system of claim 14, wherein the server comprises functionality for:

determining a plurality of respective hazards for a plurality of respective plant locations at the plant facility;

determining a plurality of respective hazard rates for the plurality of respective hazards using second historical hazard data;

determining a hazard level for the plant facility using the plurality of respective hazards and the plurality of respective hazard rates;

determining, based on the hazard level, a mitigation schedule comprising a plurality of mitigation operations, wherein the mitigation schedule is configured to reduce the hazard level for the plant facility below a predetermined threshold; and transmitting, automatically based on the mitigation schedule, a plurality of commands to one or more control systems to implement the mitigation schedule.

17. The system of claim 14, wherein the server comprises functionality for:

determining a second plant hazard for a second plant area using the second machine-learning model, second classified safety data, and second structured safety data;

determining a plurality of mitigation operations for the second plant hazard;

presenting the plurality of mitigation operations within the graphical user interface in the user device;

obtaining, from the user device, a selection of at least one of the plurality of mitigation operations; and transmitting, in response to the selection of the at least one of the plurality of mitigation operations, a second command that implements that at least one of the plurality of mitigation operations.

18. The system of claim 14, wherein server comprises functionality for:

associating, using a third machine-learning model, a plurality of hazards with a plurality of plant incidents at the plurality of plant facilities and a plurality of work orders to determine the historical hazard data, wherein the hazard rate of the first plant hazard is based on the historical hazard data that corresponds to a hazard among the plurality of hazards that is the same as the first plant hazard.

19. The system of claim 14, wherein the first plant hazard is selected from a group consisting of a chemical hazard, an electrical hazard, a physical hazard, a biological hazard, a fire hazard, and an exploding hazard.

20. The system of claim 14, wherein the control system comprises one or more sensors, a programmable logic controller (PLC), and one or more hardware components coupled to the one or more sensors.

* * * * *